United States Patent

Agiwal

(10) Patent No.: US 11,202,320 B2
(45) Date of Patent: Dec. 14, 2021

(54) METHOD AND APPARATUS OF PERFORMING RANDOM ACCESS ON UNLICENSED CARRIER

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 156 days.

(21) Appl. No.: 16/560,073

(22) Filed: Sep. 4, 2019

(65) Prior Publication Data

US 2020/0077446 A1 Mar. 5, 2020

Related U.S. Application Data

(60) Provisional application No. 62/727,253, filed on Sep. 5, 2018.

(51) Int. Cl.
*H04W 74/08* (2009.01)
*H04W 24/08* (2009.01)
*H04W 80/02* (2009.01)
*H04W 16/14* (2009.01)

(52) U.S. Cl.
CPC ....... *H04W 74/0833* (2013.01); *H04W 16/14* (2013.01); *H04W 24/08* (2013.01); *H04W 74/0808* (2013.01); *H04W 80/02* (2013.01)

(58) Field of Classification Search
CPC .............................................. H04W 74/0833
See application file for complete search history.

(56) References Cited

U.S. PATENT DOCUMENTS

| | | | |
|---|---|---|---|
| 8,576,780 B2 | 11/2013 | Vujcic | |
| 2014/0233492 A1* | 8/2014 | Nakashima | ........... H04L 5/0053 370/329 |
| 2018/0176957 A1* | 6/2018 | Zhang | ................. H04L 27/2613 |
| 2018/0242367 A1 | 8/2018 | Kim et al. | |
| 2018/0359784 A1 | 12/2018 | Agiwal et al. | |

FOREIGN PATENT DOCUMENTS

| | | |
|---|---|---|
| WO | 2017/030412 A1 | 2/2017 |
| WO | 2017/121380 A1 | 7/2017 |

OTHER PUBLICATIONS

International Search Report dated Dec. 20, 2019, issued in International Application No. PCT/KR2019/011506.

* cited by examiner

*Primary Examiner* — Sulaiman Nooristany
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method by a terminal for performing a random access (RA) procedure is provided. The method comprises transmitting a first RA preamble to a base station, initiating to monitor a first RA response (RAR) as a response to the first RA preamble in an RAR window, and based on the terminal failing to receive the first RAR in until end of a retransmission time, transmitting a second RA preamble to the base station.

20 Claims, 10 Drawing Sheets

METHOD AND APPARATUS OF PERFORMING RANDOM ACCESS ON UNLICENSED CARRIER

CROSS-REFERENCE TO RELATED APPLICATION(S)

This application is based on and claims priority under 35 U.S.C. § 119(e) of a U.S. Provisional application Ser. No. 62/727,253, filed on Sep. 5, 2018, in the U.S. Patent and Trademark Office, the disclosure of which is incorporated by reference herein in its entirety.

BACKGROUND

1. Field

The disclosure relates to a system and a method for performing random access on an unlicensed carrier.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands, but also in higher frequency millimeter Wave (mmWave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, smart building, smart city, smart car or connected cars, smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports not only the voice service, but also data service. The 4G wireless communication system has been developed to provide high-speed data service. However, the 4G wireless communication system currently suffers from lack of resources to meet the growing demand for high-speed data services. Therefore, the 5G wireless communication system is being developed to meet the growing demand of various services with diverse requirements, e.g., high-speed data services, support ultra-reliability and low latency applications.

In addition, the 5G wireless communication system is expected to address different use cases having quite different requirements in terms of data rate, latency, reliability, mobility etc. However, it is expected that the design of the air-interface of the 5G wireless communication system would be flexible enough to serve user equipment (UEs) having quite different capabilities depending on the use case and market segment in which the UE caters service to the end customer. Example use cases the 5G wireless communication system is expected to address includes enhanced mobile broadband (eMBB), massive Machine Type Communication (m-MTC), ultra-reliable low latency communication (URLL), etc. The eMBB requirements like tens of gigabits per second (Gbps) data rate, low latency, high mobility so on, address the market segment representing the wireless broadband subscribers of the related art needing internet connectivity everywhere, all the time and on the go. The m-MTC requirements like very high connection density, infrequent data transmission, very long battery life, low mobility address so on, address the market segment representing the IoT/IoE envisioning connectivity of billions of devices. The URLL requirements like very low latency, very high reliability and variable mobility so on and so forth address the market segment representing the Industrial automation application, vehicle-to-vehicle/vehicle-to-infrastructure communication that is foreseen as one of the enablers for autonomous cars.

The current design of 5G wireless communication system is for operation on licensed carrier(s). A study has been initiated recently to study enhancements to 5G wireless communication system for operation on unlicensed carrier(s). The main motivation of using unlicensed carrier is capital expenditures (CAPEX) reduction for cellular operators by utilizing free spectrum access for intelligent data offloading; improved and intelligent spectrum access and management, to address increasing wireless traffic demand under limited available spectrum and allowing network operators without licensed spectrum to utilize the radio efficient 3rd generation partnership project (3GPP) radio access technology. Various deployment scenarios are being considered for operation on unlicensed carrier(s) such as:

New radio-unlicensed (NR-U) licensed assisted access (LAA): Carrier aggregation between licensed band NR (primary cell (PCell)) and unlicensed band NR-U (secondary cell (SCell))

NR-U stand-alone (SA): Stand-alone NR-U

LTE NR unlicensed-dual connectivity (ENU-DC): Dual connectivity between licensed band LTE (PCell) and unlicensed band NR-U (PSCell)

NR unlicensed-dual connectivity (NNU-DC): Dual connectivity between licensed band NR (PCell) and unlicensed band NR-U (PSCell)

Note that the scenarios above include an NR cell with downlink (DL) in unlicensed band and uplink (UL) in licensed band.

One of the goals of the above study is to identify enhancements needed to support random access (RA) procedure in unlicensed band. In the 5G (also referred as NR or New Radio) wireless communication system, RA procedure is used to achieve UL time synchronization. RA procedure is used during initial access, handover, radio resource control (RRC) connection re-establishment procedure, scheduling request transmission, secondary cell group (SCG) addition/modification and data or control information transmission in UL by non-synchronized user equipment (UE) in RRC CONNECTED state. During the RA procedure, UE first transmits RA preamble (also referred as message 1 (Msg1)) and then waits for RA response (RAR) or message 2 (Msg2) in the RAR window corresponding to its RA preamble transmission. Next generation node B (GNB) transmits the RAR on physical DL shared channel (PDSCH) addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The maximum size of RAR-window is one radio frame, i.e. 10 ms. The RA-RNTI is calculated as follows: RA-RNTI=1+ $s\_id+14*t\_id+14*80*f\_id+14*80*8*ul\_carrier\_id$, where $s\_id$ is the index of the first orthogonal frequency division multiplexing (OFDM) symbol of the PRACH occasion where UE has transmitted Msg1, i.e. RA preamble; $0 \leq s\_id < 14$, $t\_id$ is the index of the first slot of the PRACH occasion ($0 \leq t\_id < 80$), $f\_id$ is the index of the PRACH occasion within the slot in the frequency domain ($0 \leq f\_id < 8$), and $ul\_carrier\_id$ is the UL carrier used for Msg1 transmission (0 for normal UL (NUL) carrier and 1 for supplementary UL (SUL) carrier.

Several RARs for various RA preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE retransmits the RA preamble.

If the RAR corresponding to its RA preamble transmission is received and UE has transmitted a dedicated RA preamble, RA procedure is considered successful. If the UE has transmitted a non-dedicated (i.e. contention based) RA preamble then upon successful reception of RAR, the UE transmits message 3 (Msg3) in UL grant received in RAR. Msg3 includes message such as RRC connection request, RRC connection re-establishment request, RRC handover confirm, scheduling request, etc. It also includes the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC CE including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE retransmits the RA preamble.

The cell on which UE transmits RA preamble can be a licensed carrier or unlicensed carrier. In case carrier used for UL transmission is unlicensed carrier, UE needs to perform channel sensing to determine whether channel is free or not before transmitting Msg1 and Msg3 in the UL. Msg1 and Msg3 are transmitted in UL on unlicensed carrier if channel is free. Similarly, if the carrier used for DL transmission is unlicensed carrier, gNB needs to perform channel sensing to determine whether the channel is free or not before transmitting Msg2 and message 4 (Msg4) in the DL. Msg2 and Msg4 are transmitted in DL on unlicensed carrier if channel is free.

It is possible that gNB has received RA preamble but is not able to transmit RAR in RAR window as channel is not free. UE will retransmit PRACH preamble upon RAR window expiry. The retransmitted PRACH preamble may not be received by gNB because of collision or UE may fail to retransmit PRACH preamble or retransmission may be delayed due to channel being not free in the UL. This problem can be avoided by having larger RAR window size. However large RAR window size will delay the retransmission in case RA preamble is not received by GNB. So a method is needed to overcome this issue.

The longer RAR window size will also lead to RA-RNTI ambiguity as RA-RNTI value is unique for PRACH occasions within an interval equal to radio frame, i.e. 10 ms. So a method is needed to resolve this ambiguity.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

The cell on which user equipment (UE) transmits random access (RA) preamble can be a licensed carrier or unlicensed carrier. In case carrier used for uplink (UL) transmission is unlicensed carrier, UE needs to perform channel sensing to determine whether channel is free or not before transmitting message 1 (Msg1) and message 3 (Msg3) in the UL. Msg1 and Msg3 are transmitted in UL on unlicensed carrier if channel is free. Similarly, if the carrier used for downlink (DL) transmission is unlicensed carrier, next generation node (gNB) needs to perform channel sensing to determine whether the channel is free or not before transmitting message 2 (Msg2) and message 4 (Msg4) in the DL. Msg2 and Msg4 are transmitted in DL on unlicensed carrier if channel is free. It is possible that gNB has received RA preamble but is not able to transmit random access response (RAR) in RAR window as channel is not free. UE will retransmit physical random access channel (PRACH) preamble upon RAR window expiry. The retransmitted PRACH preamble may not be received by gNB because of collision or UE may fail to retransmit PRACH preamble or retransmission may be delayed due to channel being not free in the UL. This problem can be avoided by having larger RAR window size. However large RAR window size will delay the retransmission in case RA preamble is not received by gNB. So a method is needed to overcome this issue. The longer RAR window size will also lead to RA-RNTI ambiguity as RA-radio network temporary identifier (RA-RNTI) value is unique for PRACH occasions within an interval equal to radio frame, i.e., 10 ms. So a method is needed to resolve this ambiguity.

In accordance with an aspect of the disclosure, a method by a terminal for performing a RA procedure is provided. The method includes transmitting a first RA preamble to a base station, initiating monitoring of a first RA response (RAR) as a response to the first RA preamble in an RAR window, and based on the terminal failing to receive the first RAR until the end of a retransmission time, transmitting a second RA preamble to the base station.

In accordance with another aspect of the disclosure, a method by a base station for performing a RA procedure is provided. The method includes receiving a first RA preamble from a terminal, and transmitting a first RAR as a response to the first RA preamble to the terminal. The first RAR is monitored in an RAR window. Based on the first RAR not being received by the terminal until the end of a retransmission time, a second RA preamble is transmitted from the terminal.

In accordance with another aspect of the disclosure, a terminal in a wireless communication system is provided. The terminal includes a transceiver and a processor coupled with the transceiver. The processor is configured to control the transceiver to transmit a first RA preamble to a base station, initiate monitoring of a first RAR as a response to the first RA preamble in an RAR window, and based on the first RAR not being received until the end of a retransmission time, control the transceiver to transmit a second RA preamble to the base station.

In accordance with another aspect of the disclosure, a base station in a wireless communication system is provided. The base station includes a transceiver and a processor coupled with the transceiver. The processor is configured to control the transceiver to receive a first RA preamble from a terminal, and to transmit a first RAR as a response to the first RA preamble to the terminal. The first RAR is monitored in an RAR window. Based on the first RAR not being received by the terminal until the end of a retransmission time, a second RA preamble is transmitted from the terminal.

The proposed methods reduce the delay in the retransmission caused by configuration of large RAR window size in case RA preamble is not received by gNB. The proposed methods also overcome the RA-RNTI ambiguity problem.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
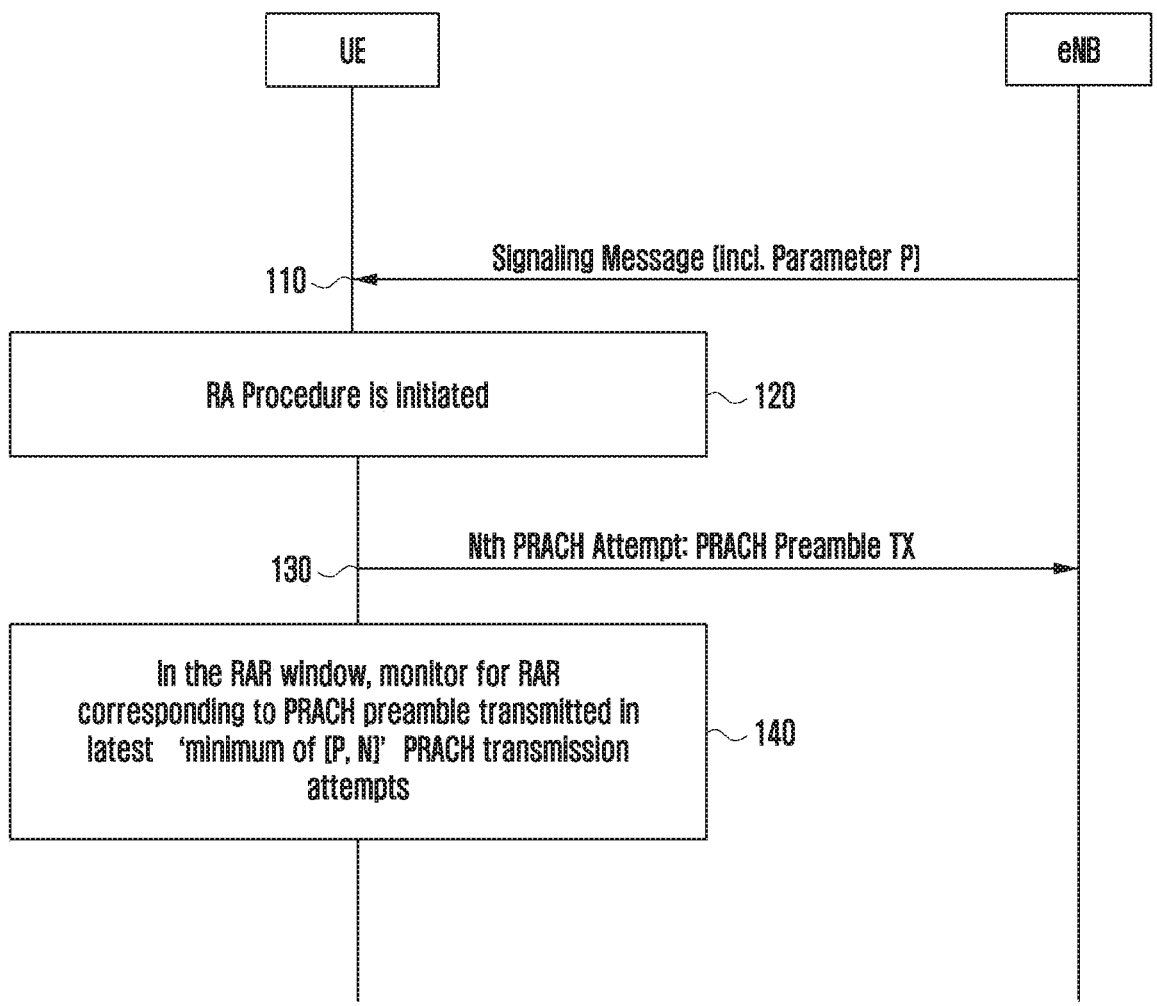
FIG. 1 shows signaling flow between a user equipment (UE) and a next generation node B (gNB) according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a user equipment (UE) and may be referred to as a BS, base transceiver station (BTS), node B (NB), evolved NB (eNB), access point (AP), fifth generation (5G) NB (5GNB), or next generation NB (gNB).

A "UE" is an entity communicating with a BS and may be referred to as a UE, device, mobile station (MS), mobile equipment (ME), or terminal.

Reducing Retransmission Delay Due to Large Random Access (RA) Response (RAR) Window Size Method 1

In this method of the disclosure, upon receiving the RA channel (RACH) preamble if gNB is not able to transmit RAR in RAR window corresponding to the received RACH preamble, gNB can transmit RAR corresponding to the received RACH preamble after the expiry of this RAR window. The RAR window corresponding to the received RACH preamble starts at an offset from end of physical RACH (PRACH) occasion in which that RACH preamble is received. PRACH occasion is the time/frequency resource in which RACH preamble is transmitted.

Figure 2:
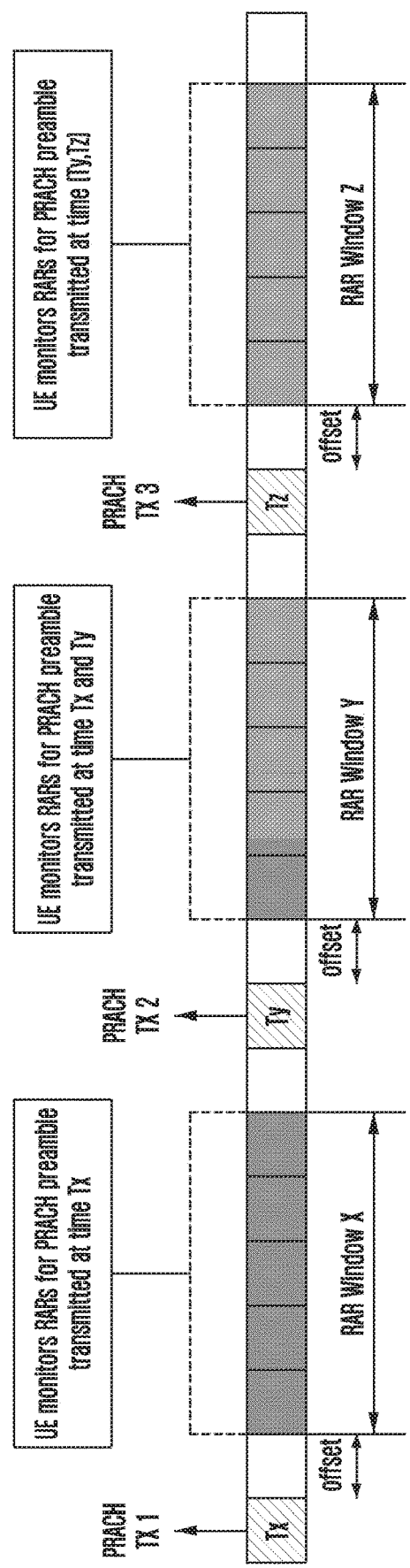
FIG. 2 is an example illustration of the procedure according to an embodiment of the disclosure.

FIG. 1 shows signaling flow between a UE and a gNB according to an embodiment of the disclosure. FIG. 2 is an example illustration of the procedure according to an embodiment of the disclosure.

As shown in the FIG. 2, if gNB has received RACH preamble transmitted in time interval Tx and it is not able transmit RAR in RAR window X, gNB can transmit RAR for RACH preamble transmitted in time interval Tx in RAR window Y.

In this method of disclosure, during the RAR window corresponding to Nth (where N=1, 2, 3, . . . , and so on) PRACH transmission attempt of a RA procedure, UE monitors for RAR corresponding to PRACH preamble transmitted in Nth PRACH transmission attempt as well as PRACH preambles transmitted in previous 'minimum of [P, N=1]' PRACH transmission attempts. For example, if P is 4, for the PRACH transmission attempt number (N) 3, in the RAR window corresponding to the third PRACH transmission attempt, UE monitors RAR for PRACH preamble transmitted in 3rd, 2nd and 1st PRACH transmission attempts. In other words, in this method of disclosure, during the RAR window corresponding to Nth PRACH transmission attempt of a RA procedure, UE monitors for RAR corresponding to PRACH preamble transmitted in latest 'minimum of [P, N]' PRACH transmission attempts. In an embodiment, P is all the PRACH transmission attempts. In another embodiment, P is signaled by gNB in system information (SI) or dedicated radio resource control (RRC) signaling as shown in FIG. 1. Referring to FIG. 1, a gNB transmits a signaling message including parameter P to a UE at operation 110. P can be included in included in RACH configuration signaled by gNB in SI or dedicated RRC signaling. The UE initiates an RA procedure at operation 120. The RA procedure is used during initial access, handover, RRC connection re-establishment procedure, scheduling request transmission, secondary cell group (SCG) addition/modification and data or control information transmission in uplink (UL) by non-synchronized UE in RRC CONNECTED state. During the RA procedure, the UE first transmits a PRACH preamble and then waits for RAR in the RAR window corresponding to its PRACH preamble transmission. If the RAR corresponding to its PRACH preamble transmission is not received during the RAR window and the UE has not yet transmitted the PRACH preamble for a configurable (configured by gNB in RACH configuration) number of times, the UE retransmits the PRACH preamble. The UE transmits the PRACH preamble at operation 130, the UE monitors for RAR corresponding to PRACH preamble transmitted in latest 'minimum of [P, N]' PRACH transmission attempts in the RAR window at operation 140, where 'N' is the PRACH attempt number of PRACH preamble transmission. For example if P is 2, after the first PRACH preamble transmission, UE monitors for RAR corresponding to first PRACH preamble transmission attempt; after the second PRACH preamble transmission, UE monitors for RAR corresponding to first and second PRACH preamble transmission attempts; after the third PRACH preamble transmission UE monitors for RAR corresponding to second and third PRACH preamble transmission attempts; and so on. Note that the above procedure is performed for every PRACH transmission attempt.

Referring to FIG. 2, an example of this procedure is illustrated. In this example P is equal to 1. For a RA procedure, UE transmits PRACH preamble for 1st PRACH transmission attempt in time interval Tx. UE monitors RAR for PRACH preamble transmitted in time interval Tx in RAR window X. If RAR for PRACH preamble transmitted at time Tx is not received in RAR window X, UE retransmits (i.e. 2nd PRACH transmission attempt) PRACH preamble in time interval Ty. UE monitors RARs for PRACH preamble transmitted in time intervals Tx and Ty in RAR window Y. If any RAR for PRACH preamble transmitted at time Tx and Ty is not received in RAR window Y, UE retransmits (i.e. 3rd PRACH transmission attempt) PRACH preamble in time interval Tz. UE monitors RARs for PRACH preamble transmitted in time intervals Tz and Ty in RAR window Z.

In an embodiment of the disclosure, if parameter P is configured by gNB in SI or dedicated RRC signaling, then during the RAR window corresponding to Nth PRACH transmission attempt of a RA procedure, UE monitors for RAR corresponding to PRACH preamble transmitted in latest 'minimum of [P, N]' PRACH transmission attempts. Otherwise, during the RAR window corresponding to Nth PRACH transmission attempt of a RA procedure, UE monitors for RAR corresponding to PRACH preamble transmitted in Nth PRACH transmission attempt.

In an embodiment of the disclosure, if parameter indicating early preamble retransmission is configured by gNB in SI or dedicated RRC signaling, then during the RAR window corresponding to Nth PRACH transmission attempt of a RA procedure, UE monitors for RAR corresponding to PRACH preamble transmitted in all previous PRACH transmission attempts of this RA procedure. Otherwise, during the RAR window corresponding to Nth PRACH transmission attempt of a RA procedure, UE monitors for RAR corresponding to PRACH preamble transmitted in Nth PRACH transmission attempt of RA procedure.

Method 2

In this method of the disclosure, two types (type 1, type 2) of RAR windows are signaled by gNB in SI or dedicated RRC signaling. RAR window size of type 1 RAR window and RAR window size of type 2 RAR window can be included in RACH configuration signaled by gNB in SI or dedicated RRC signaling. In an embodiment, one RAR window size is configured, and size of type 1 RAR window and type 2 RAR window is equal to this RAR window size. The Type 1 window is also referred as 'Regular RAR window.' The Type 2 window is also referred as 'Extended RAR window.' The presence of Type 2 window can be signaled by a one bit indicator or by presence of type 2 RAR window size in in SI or dedicated RRC signaling.

In this method of the disclosure, after transmitting the Nth PRACH transmission (i.e. PREAMBLE_TX_COUNTER=N−1), UE monitors for RAR corresponding to Nth PRACH Transmission in Type 1 RAR window. N is the PRACH transmission attempt number and is equal to 1, 2, 3, and so on.

Figure 3:
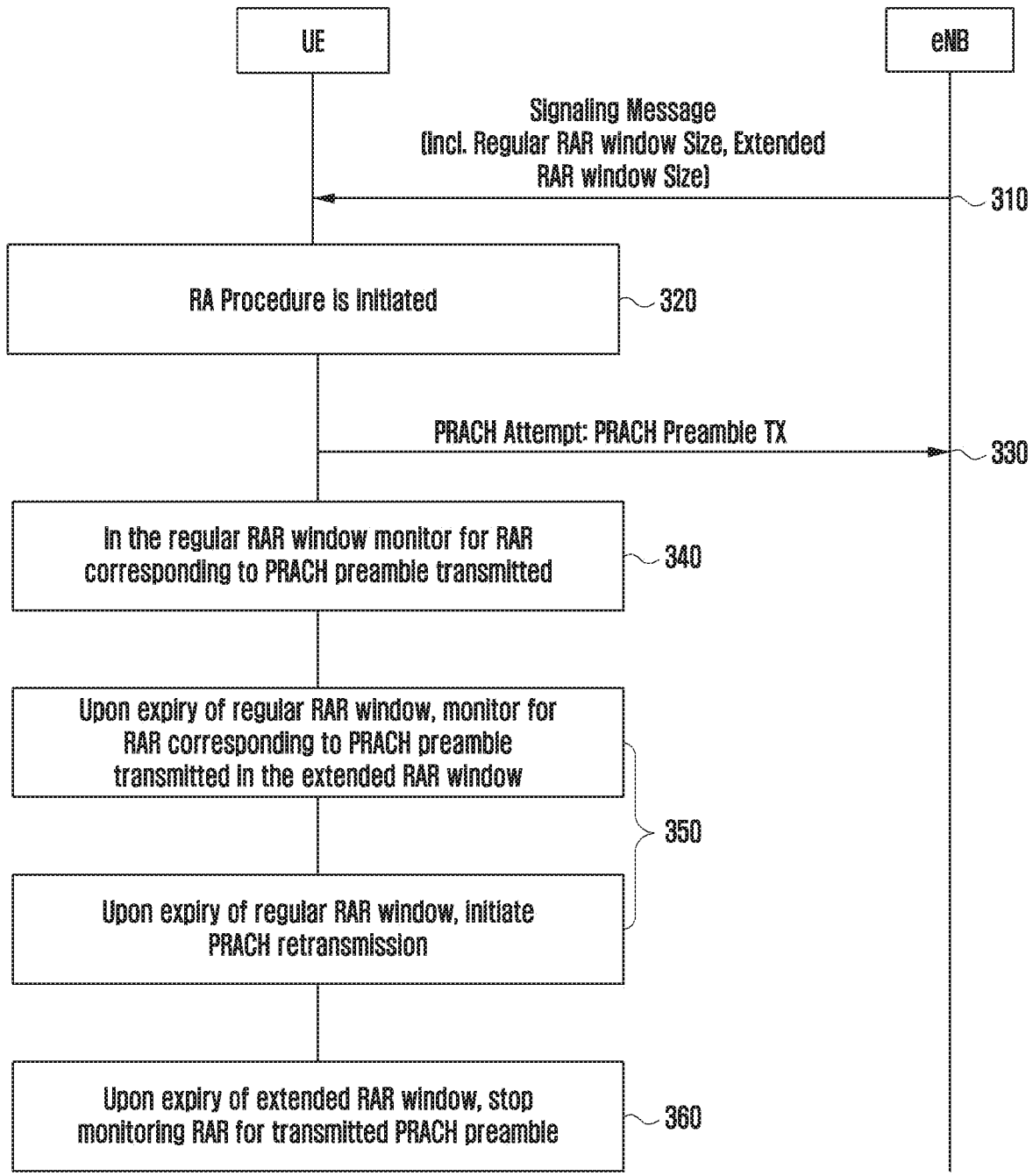
FIG. 3 shows signaling flow between a UE and a gNB according to an embodiment of the disclosure.

FIG. 3 shows signaling flow between a UE and a gNB according to an embodiment of the disclosure.

Referring to FIG. 3, a gNB transmits a signaling message including information on a regular RAR window size and an extended RAR window size to a UE at operation 310. The UE initiates an RA procedure at operation 320. During the RA procedure, the UE first transmits a PRACH preamble and then waits for RAR in the RAR window corresponding to its PRACH preamble transmission. If the RAR corresponding to its PRACH preamble transmission is not received during the RAR window and the UE has not yet transmitted the PRACH preamble for a configurable (configured by gNB in RACH configuration) number of times, the UE retransmits the PRACH preamble. After Nth (N=1, 2, and so on) PRACH attempt, i.e. the UE transmits the PRACH preamble at operation 330, the UE monitors for RAR corresponding to PRACH preamble in the regular (type 1) RAR window at operation 340. If UE fails to receive the RAR in regular (type 1) RAR window for the Nth PRACH transmission, it transmits the N+1th PRACH transmission, i.e. selects preamble and RACH occasion (RO) and transmits PRACH preamble, and it also continues to monitor RAR in extended (type 2) RAR window for Nth PRACH transmission at operation 350. In other words, the UE identifies a retransmission time based on the regular (type 1) RAR window, and transmits the N+1th PRACH transmission based on the retransmission time, and continues to monitor the RAR for the Nth PRACH transmission in the extended (type 2) RAR window. The UE may monitor both the RAR for the Nth PRACH transmission and the RAR for the N+1th PRACH transmission in a time period where the extended (type 2) RAR window for the Nth PRACH transmission and the regular (type 1) RAR window for the N+1th PRACH transmission are overlapped. If UE fails to receive RAR in extended (type 2) RAR window for Nth PRACH transmission, it stops monitoring RAR for Nth PRACH transmission at operation 360. Note that the above procedure is performed for every PRACH transmission attempt.

The advantage of this procedure is that if preamble is received by gNB and it is not able to transmit RAR in regular RAR window corresponding to the received RACH preamble, it can still transmit RAR in extended RAR window. However, if the preamble is not received by gNB, there is no delay in retransmission as UE can retransmit RACH preamble after the end of regular RAR window.

Figure 4:
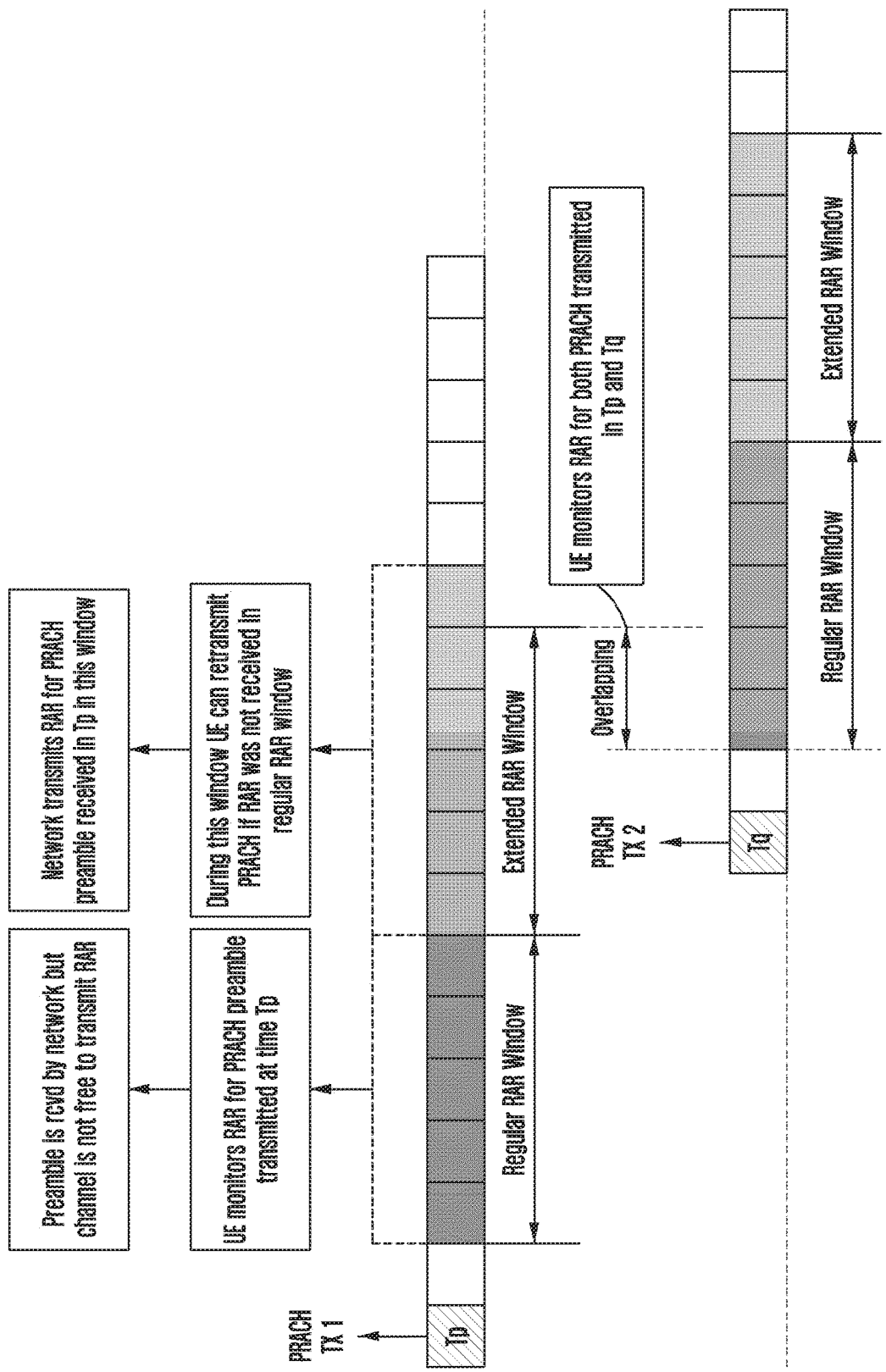
FIG. 4 is an example illustration of the procedure according to an embodiment of the disclosure.

FIG. 4 is an example illustration of the procedure according to an embodiment of the disclosure.

UE transmits PRACH preamble in time interval Tp. UE monitors for RAR in regular RAR window for the PRACH preamble transmitted in time interval Tp. If the UE fails to receive RAR in regular RAR window, it retransmits the PRACH preamble. It also continues to monitor RAR for previous PRACH preamble transmission in extended RAR window. UE may have to monitor RARs for multiple PRACH preamble transmissions concurrently in the proposed procedure. For example, the UE monitors both the RAR for the Nth PRACH transmission and the RAR for the N+1th PRACH transmission in a time period where the extended (type 2) RAR window for the Nth PRACH transmission and the regular (type 1) RAR window for the N+1th PRACH transmission are overlapped.

In an embodiment of the disclosure, Type 1 RAR window is the RAR window and RAR window size is signaled by gNB in SI or dedicated RRC signaling. Instead of type 2 RAR window, extended monitoring period can be configured by gNB in SI or dedicated RRC signaling. Extending monitoring period starts from end of RAR window. The operation of RAR window and extended monitoring is same as Type 1 RAR window and Type 2 RAR window respectively.

Method 3

In this method of disclosure, in addition to RAR window size, retransmission time (or timer) T is also signaled by gNB in SI or dedicated RRC signaling. T can be in unit of ms or slot. If T is in unit of slot, slot length can be determined based on SCS of Msg1. Alternately, if T is in unit of slot, slot length can be determined based on SCS used for Msg2. RAR window size and retransmission time T can be included in included in RACH configuration signaled by gNB in SI or dedicated RRC signaling. The retransmission time T may start from the start of RAR window. In an alternate embodiment, the retransmission time T may start from end of RACH occasion in which PRACH preamble is transmitted.

In this method of the disclosure, after transmitting the Nth PRACH transmission (i.e. PREAMBLE_TX_COUNTER=N−1), UE monitors for RAR corresponding to Nth PRACH Transmission in RAR window. N is the PRACH transmission attempt number and is equal to 1, 2, 3, and so on.

Figure 5:
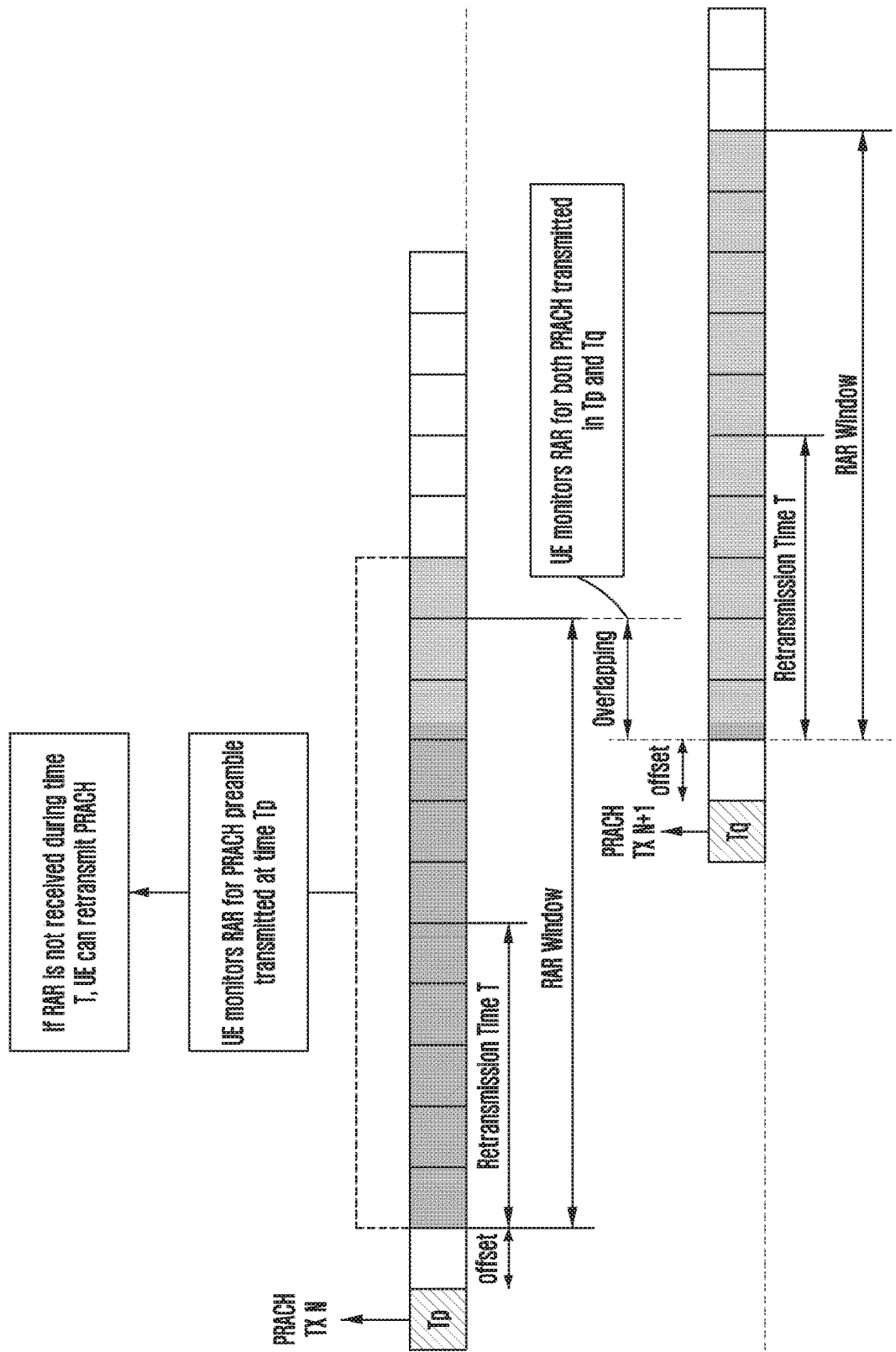
FIG. 5 is an example illustration of the procedure according to an embodiment of the disclosure.

FIG. 5 is an example illustration of the procedure according to an embodiment of the disclosure.

If UE fails to receive the RAR in until the end of retransmission time T, it transmits the N+1th PRACH transmission, i.e. selects preamble and RO, and transmits PRACH preamble. The UE also continues to monitor RAR in RAR window for Nth PRACH transmission. UE may have to monitor RARs for multiple PRACH preamble transmissions concurrently in the proposed procedure. For example, the UE monitors both the RAR for the Nth PRACH transmission and the RAR for the N+1th PRACH transmission in a time period where the RAR window for the Nth PRACH transmission and the RAR window for the N+1th PRACH transmission are overlapped. If UE fails to receive RAR in RAR window for Nth PRACH transmission, it stops monitoring RAR for Nth PRACH transmission.

In order to reduce the latency of 4 step contention based RA (CBRA) procedure, a 2 step RACH procedure is being studied. The 2 step RACH refers to the procedure which can complete RACH procedure in two steps. It comprises of 2 messages, i.e., message A (MsgA) and message B (MsgB). MsgA includes PRACH preamble and physical uplink shared channel (PUSCH) carrying payload. During the 2 step RACH procedure, UE transmits MsgA. After transmitting the MsgA in 2 step RA procedure, UE monitors PDCCH for MsgB reception. In an embodiment, UE monitors PDCCH for MsgB reception in a time window similar to RAR window in 4 step RACH procedure. The size of the window is signaled by gNB in SI or RRC signaling. The above methods 1, 2 and 3 can also be applied for 2 step RACH procedure by replacing Msg1 transmission by MsgA transmission, PRACH preamble transmission attempt by MsgA transmission attempt, RAR by MsgB and RAR window by MsgB reception window.

RA-Radio Network Temporary Identifier (RA-RNTI) Ambiguity Handling

Method 1

UE transmits the PRACH preamble. UE monitors PDCCH addressed to RA-RNTI in RAR window for RAR reception. In this method of disclosure, RA-RNTI corresponding to PRACH preamble transmission is determined by UE and gNB as follows:

$$RA\text{-}RNTI = 1 + s\_id + X1*t\_id + X1*X2*f\_id + X1*X2*X3*ul\_carrier\_id + X1*X2*X3*2*frame\_id$$

Where, frame_id=(SFN_id)mod(frame_id_max);

frame_id_max=Ceiling (Max RAR Monitoring Duration in slots/Number of slots in radio frame); the 'Max RAR Monitoring Duration' is the RAR window size in slots configured by gNB in SI or dedicated RRC signaling; Ceiling function is not needed if RAR window size is in multiple of 'Number of slots in radio frame.' The 'Number of slots in radio frame' is per-defined for different subcarrier spacings (SCSs). The SCS used to determine number of slots in radio frame is the SCS used for PDCCH monitoring of RAR.

SFN_id is system frame number (SFN) of radio frame in which PRACH occasion starts;

s_id is the index of the first orthogonal frequency division multiplexing (OFDM) symbol of the PRACH occasion where UE has transmitted message 1 (Msg1), i.e. RA preamble; $0 \le s\_id < X1$. X1 is the maximum number of OFDM symbols in a slot. In an example it can be 14.

t_id is the index of the first slot of the PRACH occasion ($0 \le t\_id < X2$). X2 is the maximum number of slots in a radio frame. In an example it can be 80.

f_id is the index of the PRACH occasion within the slot in the frequency domain ($0 \le f\_id < X3$); X3 is the maximum number of frequency division multiplexed (FDMed) ROs. In an example, it can be 8. f_id may also start from a configurable value instead of zero.

ul_carrier_id is the UL carrier used for Msg1 transmission (0 for normal UL (NUL) carrier) and 1 for supplementary UL (SUL) carrier)

Method 2

UE transmits the PRACH preamble. UE monitors PDCCH addressed to RA-RNTI in RAR window for RAR reception. In this method of disclosure, RA-RNTI corresponding to PRACH preamble transmission is determined by UE and gNB as follows:

$$RA\text{-}RNTI = 1 + s\_id + X1*t\_id + X1*X2*f\_id + X1*X2*X3*ul\_carrier\_id;$$

Where, frame_id=(SFN_id)mod(frame_id_max);

frame_id_max=Ceiling(Max RAR Monitoring Duration in slots/Number of slots in radio frame); the 'Max RAR Monitoring Duration' is the RAR window size in slots configured by gNB in SI or dedicated RRC signaling; Ceiling function is not needed if RAR window size is in multiple of 'Number of slots in radio frame.' The 'Number of slots in radio frame' is per-defined for different SCSs. The SCS used to determine number of slots in radio frame is the SCS used for PDCCH monitoring of RAR. SCS can be signaled by gNB.

SFN_id is SFN of radio frame in which PRACH occasion starts;

s_id is the index of the first OFDM symbol of the PRACH occasion where UE has transmitted Msg1, i.e. RA preamble; 0≤s_id<X1. X1 is the maximum number of OFDM symbols in a slot. In an example it can be 14.

t_id is the index of the first slot of the PRACH occasion (0≤t_id<X2). X2 is the maximum number of slots in a radio frame. In an example it can be 80.

f_id is the index of the PRACH occasion within the slot in the frequency domain (0≤f_id<X3); X3 is the maximum number of FDMed RACH ROs. In an example, it can be 8. f_id may also start from a configurable value instead of zero.

ul_carrier_id is set as follows
ul_carrier_id=frame_id for NUL;
ul_carrier_id=frame_id+frame_id_max for SUL
In alternate embodiment, ul_carrier_id is set as follows
ul_carrier_id=2+frame_id for NUL;
ul_carrier_id=2+frame_id+frame_id_max for SUL The advantage of this method is that change to RA-RNTI equation is minimized by modifying the encoding of ul_carrier_id.

Method 3

UE transmits the PRACH preamble. UE monitors PDCCH addressed to RA-RNTI in RAR window for RAR reception. In this method of disclosure, RA-RNTI corresponding to PRACH preamble transmission is determined by UE and gNB as follows:

RA-RNTI=1+$s\_id+X1*t\_id+X1*X2*f\_id+X1*X2*X3*ul\_carrier\_id$;

Where, frame_id=(SFN_id)mod(frame_id_max);
frame_id_max=Ceiling(Max RAR Monitoring Duration in slots/Number of slots in radio frame); the 'Max RAR Monitoring Duration' is the RAR window size in slots configured by gNB in SI or dedicated RRC signaling; Ceiling function is not needed if RAR window size is in multiple of 'Number of slots in radio frame.' The 'Number of slots in radio frame' is per-defined for different SCSs. The SCS used to determine number of slots in radio frame is the SCS used for PDCCH monitoring of RAR.

SFN_id is SFN of radio frame in which PRACH occasion starts;

s_id is the index of the first OFDM symbol of the PRACH occasion where UE has transmitted Msg1, i.e. RA preamble; 0≤s_id<X1. X1 is the maximum number of OFDM symbols in a slot. In an example it can be 14.

t_id is the index of the first slot of the PRACH occasion (0≤t_id<X2). X2 is the maximum number of slots in a radio frame. In an example it can be 80.

ul_carrier_id is the UL carrier used for Msg1 transmission (0 for NUL (normal uplink carrier) and 1 for SUL (supplementary carrier)

f_id is the index of the PRACH occasion within the slot in the frequency domain.

Figure 6:
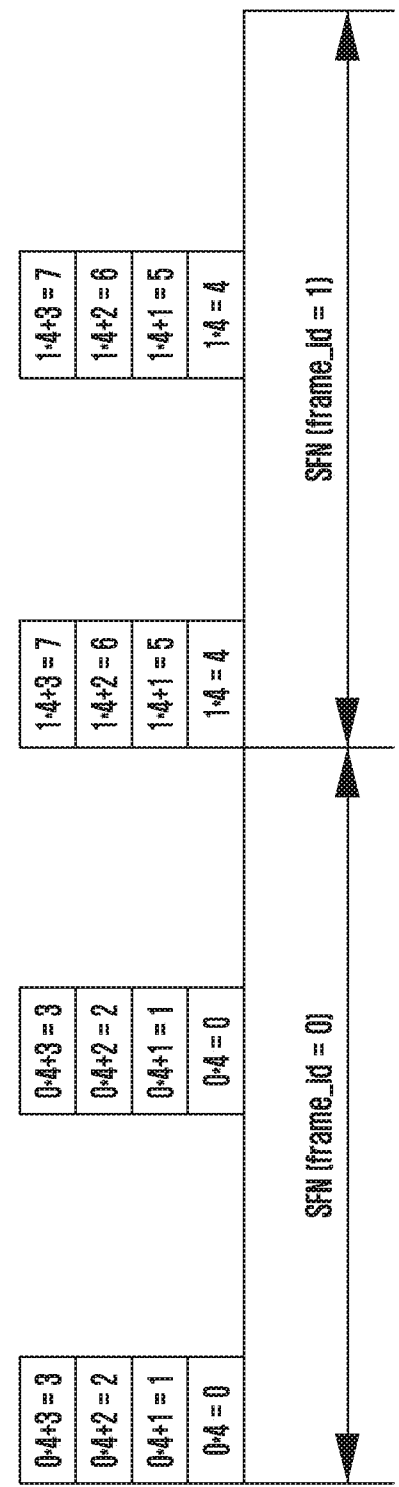
FIG. 6 shows an example illustration of the calculation of 'f_id' according to an embodiment of the disclosure.

FIG. 6 shows an example illustration of the calculation of 'f_id' according to an embodiment of the disclosure.

f_id can be calculated as follows:

As shown in FIG. 6, each FDMed ROs is numbered sequentially starting from 'frame_id*maximum number of FDMed ROs' instead of zero. In this example, 'frame_id' of the first (i.e., left) radio frame in FIG. 6 is 0, and 'frame_id' of the second (i.e., right) radio frame in FIG. 6 is 1. The maximum number of FDMed ROs in FIG. 6 is 4. The FDMed ROs of the first radio frame in FIG. 6 are numbed sequentially starting from zero, whereas the FDMed ROs of the second radio frame in FIG. 6 are numbered sequentially starting from '1*4,' i.e., 4.

f_id of each FDMed ROs is smaller than 'frame_id* maximum number of FDMed ROs+X3.' X3=maximum number of FDMed ROs*frame_id_max. In this example, since 'frame_id_max' is 1, X3 is '4*1,' i.e., 4.

The FDMed ROs of the first radio frame in FIG. 6 are numbered 0 to 3, and the FDMed ROs of the second radio frame in FIG. 6 are numbered 4 to 7. Each FDMed ROs of the first radio frame and the second radio frame in FIG. 6 has a distinguishable f_id.

Alternately, f_id can be calculated as follows:

Each frequency division multiplexed ROs is numbered sequentially starting from '[frame_id*maximum number of FDMed ROs]+offset' instead of zero. Offset is signaled in RACH configuration. If not signaled, offset is considered as zero.

Method 4

UE transmits the PRACH preamble. UE monitors PDCCH addressed to RA-RNTI in RAR window for RAR reception. RA-RNTI corresponding to PRACH preamble transmission is determined by UE and gNB as follows:

RA-RNTI=1+$s\_id+X1*t\_id+X1*X2*f\_id+X1*X2*X3*ul\_carrier\_id$;

Where,

SNF_id is SFN of radio frame in which PRACH occasion starts;

s_id is the index of the first OFDM symbol of the PRACH occasion where UE has transmitted Msg1, i.e. RA preamble; 0≤s_id<X1. X1 is the maximum number of OFDM symbols in a slot. In an example it can be 14.

t_id is the index of the first slot of the PRACH occasion (0≤t_id<X2). X2 is the maximum number of slots in a radio frame. In an example it can be 80.

ul_carrier_id is the UL carrier used for Msg1 transmission (0 for NUL (normal uplink carrier) and 1 for SUL (supplementary carrier)

f_id is the index of the PRACH occasion within the slot in the frequency domain (0≤f_id<X3); X3 is the maximum number of FDMed RACH ROs. In an example, it can be 8. f_id may also start from a configurable value instead of zero.

In this method of disclosure, UE also calculates frame_id as follows:

frame_id=(SFN_id)mod(frame_id_max);
frame_id_max=Ceiling(Max RAR Monitoring Duration in slots/Number of slots in radio frame); the 'Max RAR Monitoring Duration' is the RAR window size in slots configured by gNB in SI or dedicated RRC signaling; Ceiling function is not needed if RAR window size is in multiple of 'Number of slots in radio frame.' The 'Number of slots in radio frame' is per-defined for different SCSs. The SCS used to determine number of slots in radio frame is the SCS used for PDCCH monitoring of RAR.

SFN_id is SFN of radio frame in which PRACH occasion starts, where PRACH occasion is the one in which PRACH preamble is transmitted by UE;

In this disclosure, RAR reception is considered successful if a downlink assignment has been received on the PDCCH for the RA-RNTI and the received transport block (TB) is successfully decoded and if the RAR contains a media access control (MAC) sub-protocol data unit (subPDU) with RA preamble identifier (RAPID) corresponding to the transmitted RA preamble and frame ID included in RAR matches with frame_id determined above. Frame ID may be included in a subheader. A new subheader can be defined with following field (E, T=1, R=1, R=0). Alternately, frame ID may be included in RAR service data unit (SDU) (new field is added to indicate frame_id).

RA Resource Selection

Listen-before-talk (LBT) procedure is vital for fair and friendly coexistence of devices and technologies operating in unlicensed spectrum. LBT procedures on a node attempting to transmit on a carrier in unlicensed spectrum require the node to perform a clear channel assessment to determine if the channel is free for use. The various types or categories of LBT procedures used for transmission are as follows:

Category 1: No LBT

No LBT procedure is performed by the transmitting entity.

Category 2: LBT without random back-off

The duration of time that the channel is sensed to be idle before the transmitting entity transmits is deterministic. In an example, sensing interval can be 25 us, i.e., UE can transmit, after sensing the channel to be idle for at least a sensing interval Td=25 us. For UL transmission, category 3 is also referred to as Type 2 channel access procedure.

Category 3: LBT with random back-off with a contention window of fixed size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel. The detailed category 3 LBT procedure is as follows:

UE transmits after sensing the channel to be idle during the slot durations of a defer duration (Td); and after the counter is zero in step 4. The detailed procedure is as follows:

Step 1: set N=$N_{init}$, where $N_{init}$ is a random number uniformly distributed between 0 and CWp. CWp is the contention window for a given channel access priority class 'p.' The various LBT parameters for different channel access priority class (CAPC) is listed in Table 1 below.

TABLE 1

| Channel Access Priority Class (p) | $m_P$ | $CW_{min,p}$ | $CW_{max,p}$ | $T_{mcotp}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the absence of any other technology sharing the carrier can be guaranteed on a long term basis (e.g., by level of regulation), the maximum channel occupancy time for LBT priority classes 3 and 4 is for 10 msec. Otherwise, maximum channel occupancy time for LBT priority classes 3 and 4 is for 8 msec.

Step 2: if N>0, decrement the counter, set N=N−1

Step 3: Sense the channel for an additional slot duration (Ts). If the additional slot duration is idle, go to step 4 else, go to step 5

Step 4: if N=0, perform transmission, Else, go to step 2

Step 5: sense the channel during the slot durations of an additional defer duration Td. Defer duration (Td) is equal to $T_f + m_p \times T_s$, where $T_f$ is equal to 16 us and Ts is equal to 9 us.

Step 6: If the channel is sensed to be idle during Td, go to step 2, Else, go to step 5

Category 4: LBT with random back-off with a contention window of variable size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. The detailed procedure is same as category 3. Only difference is that in category 3 size of contention window is fixed whereas in category 4 the transmitting entity can vary the size of the contention window when drawing the random number N. For UL transmission category 4 is also referred as Type 1 channel access procedure.

Embodiment 1

For RA preamble transmission on unlicensed carrier, channel sensing or LBT procedure is needed before RA preamble transmission. In a method of disclosure, UE selects RA resource as following on unlicensed carrier:

Select a synchronization signal block (SSB) which is suitable (synchronization signal (SS) reference signal received power (RSRP)>Threshold) and channel status of RO associated with that SSB is free (i.e., not busy). In order to do this first, based on SSB measurement, UE prepares a list of candidate SSBs with SS-RSRP>threshold; If none of SSBs' SS-RSRP>threshold, all transmitted SSBs are included in the candidate SSB list.

UE then checks the channel status (based on LBT) of the RO(s) corresponding to SSB(s) in candidate SSB list. The checking is done sequentially in the order in which ROs occur in association period (one or more RACH configuration periods) for these SSBs. The association period starting from SFN 0 is the period in which all SSBs are mapped to PRACH occasions at least once.

UE selects a SSB in candidate SSB list, if the channel status (based on LBT) of RO associated with the SSB is free; UE selects the PRACH preamble and RO corresponding to selected SSB.

Figure 7:
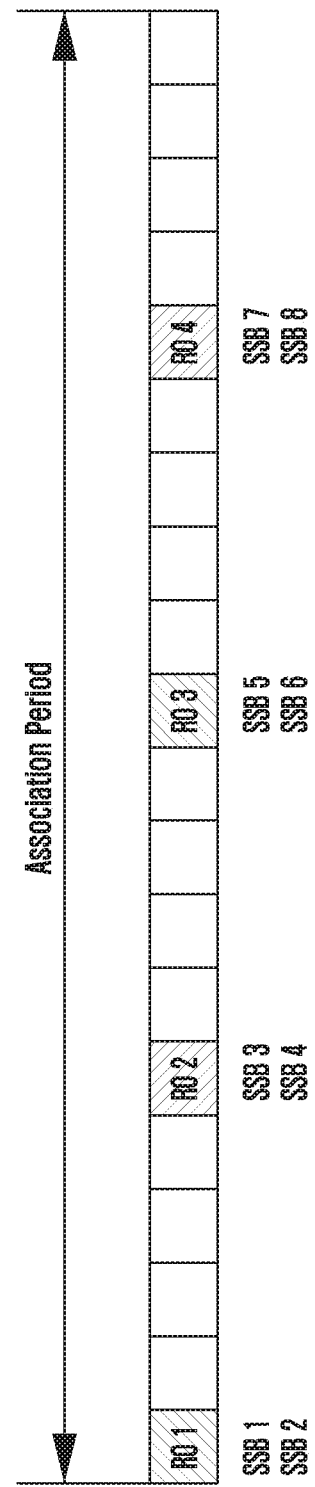
FIG. 7 shows an example illustration of random access (RA) resource selection according to an embodiment of the disclosure.

FIG. 7 shows an example illustration of RA resource selection according to an embodiment of the disclosure.

Referring to FIG. 7, if SS RSRPs of SSB3 and SSB7 are above threshold, the UE checks channel status of RO2 first and then RO4. If channel is free for RO2, the UE selects SSB3. Otherwise, if channel is free for RO4, the UE selects SSB7.

It is possible that UE is not able to find a free RO in an association period corresponding to any SSB in candidate SSB list. In this case:

Option 1: UE just keeps checking subsequent association period(s) for availability of free RO corresponding to SSB(s) in candidate SSB list.

Option 2: UE starts a RO_Selection_Timer when it starts RA resource selection. While the timer is running, UE performs the operation of RA resource selection (as explained earlier). Timer is stopped if UE is able to select RA resource (i.e., SSB, preamble and free RO associated with the SSB). Upon expiry of timer, UE may indicate RA problem to higher layer (i.e., RRC) or indicate LBT problem to higher layer. RRC may declare radio link failure (RLF) and/or perform cell reselection upon receiving this indication from MAC.

Option 3: UE selects a free RO (if available) corresponding to a SSB not in candidate SSB list. If not available, the UE follows option 2 or option 3a.

Option 3a: if UE fails to find a free RO corresponding to a SSB in candidate SSB list for some time (e.g., N association periods/timer), UE selects a free RO (if available) corresponding to a SSB not in candidate SSB list.

Embodiment 2

For RA preamble transmission on unlicensed carrier, channel sensing or LBT procedure is needed before RA preamble transmission. In a method of disclosure, UE selects RA resource as following on unlicensed carrier:

MAC entity prepares a list of candidate SSBs. If there is at least one SSB with SS-RSRP>threshold among all transmitted SSBs, the MAC entity includes all transmitted SSBs with SS-RSRP>threshold in the candidate SSB list. If none of SSBs are above threshold, the MAC entity includes all transmitted SSBs in the list.

MAC entity then selects preamble group and RACH preamble corresponding to each SSB in the list of candidate SSBs.

MAC entity informs the list of candidate SSBs and selected RACH preambles to physical layer (PHY).

PHY checks the channel status (based on LBT) of the RO(s) corresponding to SSBs in candidate SSB list, sequentially in the order in which ROs occur in association period (one or more RACH configuration periods) for these SSBs.

If a free RO corresponding to a SSB in candidate SSB list is found, the PHY transmits PRACH in that RO using the preamble received from MAC entity corresponding to that SSB. The PHY informs the MAC entity about the transmitted preamble index.

If free RO corresponding to a SSB in candidate SSB list is not found in association period (or N association periods), the PHY informs the MAC entity about failure.

If MAC entity receives indication N consecutive times or N times within a configured time (as in Embodiment 1), indicating that PHY failed to transmit PRACH preamble due to LBT failure, MAC entity may indicate RA problem to higher layer (i.e., RRC) or indicate LBT problem to higher layer. RRC may declare RLF and/or perform cell reselection upon receiving this indication from MAC. A counter (LBT_FAIL_COUNTER) can be maintained to count the LBT failures within an LBTFailureTimer. If MAC receives the indication that PHY failed to perform UL transmission due to LBT failure, UE (re-)starts the LBTFailureTimer, MAC also increments LBT_FAIL_COUNTER. If LBT_FAIL_COUNTER reaches the MAX_COUNT, LBT problem indication is sent to higher layer, i.e., RRC. If LBTFailureTimer expires, UE resets the LBT_FAIL_COUNTER, i.e., sets LBT_FAIL_COUNTER to 0. LBTFailureTimer and MAX_COUNT are configured by gNB via RRC signaling.

Power ramping counter and transmission counter are not updated if PHY was not able to transmit PRACH preamble due to LBT failure. During the RA procedure, MAC entity selects PRACH preamble and RACH occasion, and informs PHY to transmit PRACH preamble in the selected PRACH occasion. PHY checks the channel status (based on LBT where LBT category (2 or 3) for PRACH transmission is pre-defined) and transmits PRACH preamble in the selected PRACH occasion if LBT is successful. If LBT is not successful, PHY does not transmit PRACH preamble. PHY informs MAC whether it was able to transmit PRACH preamble or not. If PHY indicates that it was able to transmit PRACH preamble, MAC updates (i.e., increments counter by 1) transmission counter. If PHY indicates that it was able to transmit PRACH preamble and either of SSB/channel state information-reference signal (CSI-RS) (i.e., downlink (DL) beam) or UL TX beam selected for next preamble transmission is different than SSB/CSI-RS (i.e., DL beam) or UL TX beam selected for previous transmission respectively, MAC updates (i.e., increments counter by 1) power ramping counter. If PHY indicates that it was not able to transmit PRACH preamble because of LBT failure, MAC does not update transmission counter and power ramping counter; MAC performs RA preamble and RO selection again. Transmission counter counts the number of RA attempts during a RA procedure. Power ramping counter is used to determine the amount of power ramping (Power ramping counter−1*Power ramping step) to be applied during a RA attempt. Power ramping counter and transmission counter is set to 1 when RA procedure is initialized.

Embodiment 3

For RA preamble transmission on unlicensed carrier, channel sensing or LBT procedure is needed before RA preamble transmission. In a method of disclosure, UE selects RA resource as following on unlicensed carrier:

MAC entity selects SSB. If there is at least one SSB with SS-RSRP>threshold among all transmitted SSBs, the MAC entity selects SSB with SS-RSRP>threshold. If none of SSBs are above threshold, the MAC entity selects any SSB.

MAC entity then selects preamble group and RACH preamble corresponding to selected SSB.

MAC entity informs selected SSB and selected RACH preamble to PHY. MAC entity may also inform the ROs corresponding to selected SSB to PHY. In an embodiment, unlike the licensed carrier, MAC entity does not select randomly one RO from ROs corresponding to selected SSB.

PHY checks the channel status (based on LBT) of the RO(s) corresponding to selected SSB (informed by MAC), sequentially in the order in which ROs occur in association period (one or more RACH configuration periods) for the selected SSB.

If a free RO corresponding to selected SSB is found, the PHY transmits PRACH in that RO using the preamble received from MAC entity corresponding to that SSB Inform MAC about the RO in which preamble was transmitted.

If free RO corresponding to a selected SSB is not found in association period (or N association periods), the PHY informs MAC layer about failure.

If MAC entity receives indication N consecutive times or N times within a configured time, indicating that PHY failed to transmit PRACH due to LBT failure, MAC entity may indicate RA problem to higher layer (i.e., RRC) or indicate LBT problem to higher layer. RRC may declare RLF and/or perform cell reselection upon receiving this indication from MAC. A counter (LBT_FAIL_COUNTER) can be maintained to count the LBT failures within an LBTFailureTimer. If MAC receives the indication that PHY failed to perform UL transmission due to LBT failure, UE (re-)starts the LBTFailureTimer, MAC also increments LBT_FAIL_COUNTER. If LBT_FAIL_COUNTER reaches the MAX_COUNT, LBT problem indication is sent to higher layer, i.e., RRC. If LBTFailureTimer expires, UE resets the LBT_FAIL_COUNTER, i.e., sets LBT_FAIL_COUNTER to 0. LBTFailureTimer and MAX_COUNT are configured by gNB via RRC signaling.

Power ramping counter and transmission counter are not updated if PHY was not able to transmit PRACH preamble due to LBT failure. During the RA procedure, MAC entity selects PRACH preamble and RACH occasion, and informs PHY to transmit PRACH preamble in the selected PRACH occasion. PHY checks the channel status (based on LBT where LBT category (2 or 3) for PRACH transmission is pre-defined) and transmits PRACH preamble in the selected PRACH occasion if LBT is successful. If LBT is not successful, PHY does not transmit PRACH preamble. PHY informs MAC whether it was able to transmit PRACH preamble or not. If PHY indicates that it was able to transmit PRACH preamble, MAC updates (i.e., increments counter by 1) transmission counter. If PHY indicates that it was able to transmit PRACH preamble and either of SSB/CSI-RS (i.e., DL beam) or UL TX beam selected for next preamble transmission is different than SSB/CSI-RS (i.e., DL beam) or UL TX beam selected for previous transmission respectively, MAC updates (i.e., increments counter by 1) power ramping counter. If PHY indicates that it was not able to transmit PRACH preamble because of LBT failure, MAC does not update transmission counter and power ramping counter; MAC performs RA preamble and RO selection again. Transmission counter counts the number of RA attempts during a RA procedure. Power ramping counter is used to determine the amount of power ramping (Power ramping counter−1*Power ramping step) to be applied during a RA attempt. Power ramping counter and transmission counter is set to 1 when RA procedure is initialized.

Embodiment 4

Channel may be occupied for some DL beams.
gNB may inform the SSB indexes corresponding to these DL beams in RAR.
New RAR subheader is defined.

Figure 8:
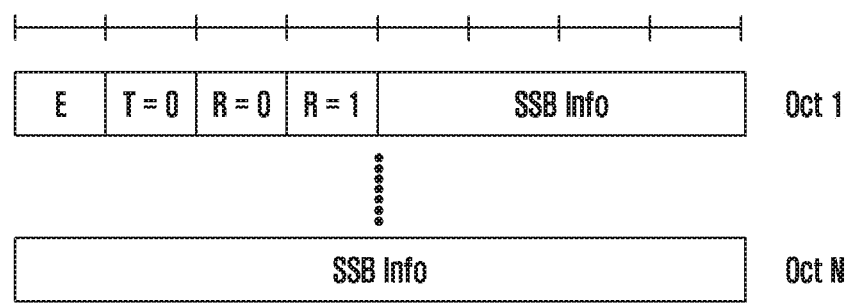
FIG. 8 shows a new random access response (RAR) subheader according to an embodiment of the disclosure.

FIG. 8 shows a new RAR subheader according to an embodiment of the disclosure.

As shown in FIG. 8, E, T (=0), R1 (=0) and R2 (=1) can indicate this new subheader. SSB Info may include a bitmap (e.g., one bit corresponding to each transmitted SSB) or SSB IDs. If UE receives an RAR MAC PDU which does not include its RAR, but includes SSB info, UE does not select the indicated SSB(s) during next PRACH re-transmission or until the duration indicated by gNB.

gNB may also inform the duration for which the indicated SSBs are not used in RAR MAC PDU or using RRC signaling. The duration can also be pre-defined.

Contention Free (CF) Vs Contention Based (CB) RA Resource Selection Criteria for New Radio-Unlicensed (NR-U)

UE may be configured with CF RA resources in addition to CB RA resources. The CFRA and CFRA resources are signaled to UE by gNB via RRC signaling. In this method of the disclosure, the criteria to select CB or CF RA resources are listed in Table 2.

TABLE 2

| | Scenario 1 | Scenario 2 | Scenario 3 | Scenario 4 | Scenario 5 | Scenario 6 |
|---|---|---|---|---|---|---|
| Channel Status of RO for at least one CF SSB is free | Yes | No | No | Yes | Yes | Yes |
| SS-RSRP of at least one CF SSB > threshold | Yes | Yes*/No | Yes*/No | No | No | No |
| Channel Status of RO for at least one CB SSB is free | Yes/No | Yes | No | Yes | Yes/No | No |
| SS-RSRP of at least one CB SSB > threshold | Yes/No | Yes/No | Yes/No | Yes | No | Yes/No |
| Type of RA Resource Selected | CF if channel status is free for CF SSB for which SS-RSRP > threshold | CB | No RA | CB if channel status is free for CB SSB for which SS-RSRP > threshold | CF | CF |

If the CF RA resources associated with SSBs have been explicitly provided by RRC (i.e., signaled by gNB in RRC signaling) and for at least one SSB among the associated SSBs, the channel status of PRACH occasion corresponding to SSB is free and SS-RSRP is greater than threshold (threshold is signaled by gNB), UE selects the SSB among the associated SSBs for which SS-RSRP is above threshold and channel status of PRACH occasion associated with that SSB is free, and then the UE selects the CF RA preamble corresponding to selected SSB. For example, as shown in Scenario 1 of Table 2, if the channel status of RO is free for CF SSB for which SS-RSRP is greater than threshold, the UE may select the CF RA resources (i.e., SSB, preamble and free RO associated with the SSB).

Else if the CF RA resources associated with SSBs have been explicitly provided by RRC and for at least one SSB among the associated SSBs, the channel status of PRACH occasion corresponding to SSB is free and there is no SSB (among all non-associated SSBs, i.e., SSBs for CF resources are not provided) for which SS-RSRP is greater than threshold (threshold is signaled by gNB), UE selects any SSB among the associated SSBs for which channel status of PRACH occasion associated with that SSB is free, and then the UE selects the CF RA preamble corresponding to selected SSB. For example, as shown in S5 of Table 2, if the channel status of RO for at least one CF SSB is free and there is no SSB for which SS-RSRP of at least one CF or CB SSB is greater than threshold, the UE may select the CF RA resources (i.e., SSB, preamble and free RO associated with the SSB).

Else if the CF RA resources associated with SSBs have been explicitly provided by RRC and for at least one SSB among the associated SSBs, the channel status of PRACH occasion corresponding to SSB is free and there is no SSB (among all transmitted SSBs) for which channel associated with that SSB is free, UE selects any SSB among the associated SSBs for which channel status of PRACH occasion associated with that SSB is free, and then the UE selects the CF RA preamble corresponding to selected SSB. For example, as shown in S6 of Table 2, if the channel status of RO for at least one CF SSB is free and there is no CB SSB for which the channel status of RO is free, the UE may select the CF RA resources (i.e., SSB, preamble and free RO associated with the SSB).

Else if there is at least one SSB (among all transmitted SSBs) for which channel associated with that SSB is free and if there is at least one SSB among all transmitted SSBs for which the channel status of PRACH occasion corresponding to SSB is free and SS-RSRP is greater than threshold (threshold is signaled by gNB), UE selects a SSB for which SS-RSRP is above threshold and channel status of PRACH occasion associated with that SSB is free, and then the UE selects the CB RA preamble corresponding to selected SSB. For example, as shown in S4 of Table 2, if there is no CF SSB for which SS-RSRP is greater than threshold and the channel status of RO for at least one CB SSB is free and SS-RSRP of at least one CB SSB is greater than threshold, the UE may select the CB RA resources (i.e., SSB, preamble and free RO associated with the SSB).

Else if there is at least one SSB (among all transmitted SSBs) for which channel associated with that SSB is free, UE selects any SSB for which channel status of PRACH occasion associated with that SSB is free, and then the UE selects the CB RA preamble corresponding to selected SSB. For example, as shown in S2 of Table 2, there is no CF SSB for which the channel status of RO is free and the channel status of RO for at least one CB SSB is free, the UE may selects the CB RA resources (i.e., SSB, preamble and free RO associated with the SSB).

In an alternate embodiment, if the CF RA resources associated with SSBs have been explicitly provided by RRC (i.e., signaled by gNB in RRC signaling) and for at least one SSB among the associated SSBs, the channel status of PRACH occasion corresponding to SSB is free and SS-RSRP is greater than threshold (threshold is signaled by gNB), UE selects the SSB among the associated SSBs for which SS-RSRP is above threshold and channel status of PRACH occasion associated with that SSB is free, and then the UE selects the CF RA preamble corresponding to the selected SSB. Else if there is at least one SSB for which the channel status of PRACH occasion corresponding to SSB is free and SS-RSRP is greater than threshold, UE selects a SSB for which SS-RSRP is above threshold and channel status of PRACH occasion associated with that SSB is free, and then the UE selects the CB RA preamble corresponding to the selected SSB. Else if there is at least one SSB for which the channel status of PRACH occasion corresponding to SSB is free, UE selects any SSB and then the UE selects the CB RA preamble corresponding to the selected SSB.

Figure 9:
FIG. 9 is a block diagram of a terminal according to an embodiment of the disclosure.

FIG. 9 is a block diagram of a terminal according to an embodiment of the disclosure.

Referring to FIG. 9, a terminal includes a transceiver 910, a controller 920 and a memory 930. The controller 920 may refer to a circuitry, an application-specific integrated circuit (ASIC), or at least one processor. The transceiver 910, the controller 920 and the memory 930 are configured to perform the operations of the UE illustrated in the figures, e.g. FIGS. 1 to 8, or as otherwise described above. Although the transceiver 910, the controller 920 and the memory 930 are shown as separate entities, they may be realized as a single entity like a single chip. The transceiver 910, the controller 920 and the memory 930 may also be electrically connected to or coupled with each other.

The transceiver 910 may transmit and receive signals to and from other network entities, e.g., a base station.

The controller 920 may control the UE to perform functions according to one of the embodiments described above. For example, the controller 920 is configured to control the transceiver 910 to transmit a first RA preamble (e.g., the Nth PRACH transmission) to the base station, and monitor a first RAR as a response to the first RA preamble in an RAR window. This RAR window may refer to a regular RAR window. If the first RAR is not received in the regular RAR window or in until end a retransmission time, the controller 920 is configured to control the transceiver 910 to transmit a second RA preamble (e.g., the N+1th PRACH transmission) to the base station, and to monitor a second RAR as a response to the second RA preamble in the RAR window. This RAR window may refer to an extended RAR window. The controller 920 may be configured to stop monitoring the first RA preamble if the first RAR is not received in the extended RAR window. The controller 920 may monitor both the first RAR and the second RAR concurrently, in a time period where the (extended) RAR window associated with the first RAR and the (regular) RAR window associated with the second RAR are overlapped. In an embodiment, the controller 920 may be configured to control the transceiver 910 to receive information on a size of the RAR window and a size of the extended RAR window from the base station in SI or dedicated RRC signaling. Alternately, the controller 920 may be configured to control the transceiver 910 to receive information on the retransmission time and a size of the RAR window from the base station in SI or dedicated RRC signaling.

In an embodiment, the operations of the terminal may be implemented using the memory 930 storing corresponding program codes. Specifically, the terminal may be equipped with the memory 930 to store program codes implementing desired operations. To perform the desired operations, the controller 920 may read and execute the program codes stored in the memory 930 by using a processor or a central processing unit (CPU).

Figure 10:
FIG. 10 is a block diagram of a base station according to an embodiment of the disclosure.

FIG. 10 is a block diagram of a base station according to an embodiment of the disclosure.

Referring to FIG. 10, a base station includes a transceiver 1010, a controller 1020 and a memory 1030. The controller 1020 may refer to a circuitry, an ASIC, or at least one processor. The transceiver 1010, the controller 1020 and the memory 1030 are configured to perform the operations of the network (e.g., gNB) illustrated in the figures, e.g. FIGS. 1 to 8, or as otherwise described above. Although the transceiver 1010, the controller 1020 and the memory 1030 are shown as separate entities, they may be realized as a single entity like a single chip. The transceiver 1010, the controller 1020 and the memory 1030 may also be electrically connected to or coupled with each other.

The transceiver 1010 may transmit and receive signals to and from other network entities, e.g., a terminal. The controller 1020 may control the base station to perform functions according to one of the embodiments described above. For example, the controller 1020 is configured to control the transceiver 1010 to receive a first RA preamble from a terminal. In order to transmit a first RAR as a response to the first RA preamble, the controller 1020 is configured to identify whether a channel associated with an unlicensed carrier is free or not. The controller 1020 is configured to control the transceiver 1010 to transmit the first RAR to the terminal if the channel is free. In an embodiment, the controller 1020 may be configured to control the transceiver 1010 to transmit information on a size of the RAR window and a size of the extended RAR window to the terminal in SI or dedicated RRC signaling. Alternately, the controller 1020 may be configured to control the transceiver 1010 to transmit information on the retransmission time and a size of the RAR window to the terminal in SI or dedicated RRC signaling. In an embodiment, the operations of the base station may be implemented using the memory 1030 storing corresponding program codes. Specifically, the base station may be equipped with the memory 1030 to store program codes implementing desired operations. To perform the desired operations, the controller 1020 may read and execute the program codes stored in the memory 1030 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system for a random access (RA) procedure on an unlicensed carrier, the method comprising:
    receiving, from a base station, information on a retransmission timer;
    transmitting, to the base station, a first RA preamble;
    initiating monitoring for a first RA response (RAR) corresponding to the first RA preamble in a first RAR window;
    transmitting, to the base station, a second RA preamble in case that the first RAR is not received until the retransmission timer expires; and
    monitoring for the first RAR and a second RAR, the second RAR corresponding to the second RA preamble, in a time period in which the first RAR window and a second RAR window overlap.

2. The method of claim 1, further comprising:
    receiving, from the base station, information on size of the first RAR window and the second RAR window.

3. The method of claim 1, further comprising:
    monitoring for the second RAR the second RAR window, after the first RAR window ends.

4. The method of claim 1, wherein a timing for the transmission of the second RA preamble is based on the first RAR window.

5. The method of claim 1, wherein the transmitting the second RA preamble further comprises:
    selecting a preamble and a random access channel (RACH) occasion for the transmission of the second RA preamble; and
    transmitting, to the base station, the second RA preamble based on the preamble and the RACH occasion.

6. The method of claim 1, wherein the information on the retransmission timer is received via system information or a dedicated radio resource control (RRC) signaling from the base station.

7. A method performed by a base station in a wireless communication system for a random access (RA) procedure on an unlicensed carrier, the method comprising:
    transmitting, to a terminal, information on a retransmission timer;
    receiving, from the terminal, a first RA preamble;
    initiating identifying whether a channel associated with the unlicensed carrier is available for a first RA response (RAR) corresponding to the first RA preamble;
    receiving, from the terminal, a second RA preamble in case that the channel is not available until the retransmission timer expires; and
    identifying whether the channel is available for the first RAR and a second RAR, the second RAR corresponding to the second RA preamble, in a time period in which the first RAR window and a second RAR window overlap.

8. The method of claim 7, further comprising:
    transmitting, to the terminal, information on a size of the first RAR window and the second RAR window.

9. The method of claim 7, further comprising:
    identifying whether the channel is available for the second RAR in the second RAR window, after the first RAR window ends.

10. The method of claim 7, wherein the information on the retransmission timer is transmitted via system information or a dedicated radio resource control (RRC) signaling to the terminal.

11. A terminal in a wireless communication system for a random access (RA) procedure on an unlicensed carrier, the terminal comprising:
    a transceiver; and
    a processor coupled with the transceiver and configured to:
        receive, from a base station via the transceiver, information on a retransmission timer,
        transmit, to the base station via the transceiver, a first RA,
        initiate monitoring for a first RA response (RAR) corresponding to the first RA preamble in a first RAR window,
        transmit, to the base station via the transceiver, a second RA preamble in case that the first RAR is not received until the retransmission time, and
        monitor for the first RAR and a second RAR, the second RAR corresponding to the second RA preamble, in a time period in which the first RAR window and a second RAR window overlap.

12. The terminal of claim 11, wherein the processor is further configured to receive, from the base station via the transceiver, information on a size of the first RAR window and the second RAR window.

13. The terminal of claim 11, wherein the processor is further configured to monitor for the second RAR in the second RAR window, after the first RAR window ends.

14. The terminal of claim 11, wherein a timing for the transmission of the second RA preamble is based on the first RAR window.

15. The terminal of claim 11, wherein the processor is further configured to:
  select a preamble and a random access channel (RACH) occasion for the transmission of the second RA preamble, and
  transmit, to the base station via the transceiver, the second RA preamble based on the preamble and the RACH occasion.

16. The terminal of claim 11, wherein the information on the retransmission timer is received via system information or a dedicated radio resource control (RRC) signaling from the base station.

17. A base station in a wireless communication system for a random access (RA) procedure on an unlicensed carrier, the base station comprising:
  a transceiver; and
  a processor coupled with the transceiver and configured to:
    transmit, to a terminal via the transceiver, information on a retransmission timer,
    receive, from the terminal via the transceiver, a first RA preamble,
    initiate identifying whether a channel associated with the unlicensed carrier is available for a first RA response (RAR) corresponding to the first RA preamble,
    receive, from the terminal via the transceiver, a second RA preamble in case that the channel is not available until the retransmission timer expires, and
    identify whether the channel is available for the first RAR and a second RAR, the second RAR corresponding to the second RA preamble, in a time period in which the first RAR window and a second RAR window overlap.

18. The base station of claim 17, wherein the processor is further configured to transmit, to the terminal via the transceiver, information on a size of the first RAR window and the second RAR window.

19. The base station of claim 17, wherein the processor is further configured to identify whether the channel is available for the second RAR in the second RAR window, after the first RAR window ends.

20. The base station of claim 17, wherein the information on the retransmission timer is transmitted via system information or a dedicated radio resource control (RRC) signaling to the terminal.

* * * * *